United States Patent
Ding

(10) Patent No.: US 12,081,549 B2
(45) Date of Patent: *Sep. 3, 2024

(54) SYSTEMS AND METHODS FOR MANAGING CUSTOM CODE IN A DATA COMPUTING PLATFORM

(71) Applicant: Palantir Technologies Inc., Denver, CO (US)

(72) Inventor: James Ding, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,501

(22) Filed: May 15, 2023

(65) Prior Publication Data

US 2023/0283610 A1  Sep. 7, 2023

Related U.S. Application Data

(63) Continuation of application No. 16/700,153, filed on Dec. 2, 2019, now Pat. No. 11,689,530.

(60) Provisional application No. 62/934,737, filed on Nov. 13, 2019.

(51) Int. Cl.
*H04L 9/40* (2022.01)

(52) U.S. Cl.
CPC ........ *H04L 63/101* (2013.01); *H04L 63/0281* (2013.01); *H04L 63/20* (2013.01)

(58) Field of Classification Search
CPC .... H04L 63/101; H04L 63/0281; H04L 63/20
See application file for complete search history.

(56) References Cited

U.S. PATENT DOCUMENTS

| | | | |
|---|---|---|---|
| 9,762,619 B1* | 9/2017 | Vaidya | H04L 63/20 |
| 10,177,909 B1* | 1/2019 | Sullivan | H04L 9/085 |
| 10,425,465 B1* | 9/2019 | Jha | H04L 67/565 |
| 10,628,244 B1* | 4/2020 | Cseri | G06F 9/547 |
| 2012/0191855 A1* | 7/2012 | Alexander | G06F 16/957 709/225 |
| 2014/0283109 A1* | 9/2014 | Quong | H04L 63/101 726/27 |

(Continued)

FOREIGN PATENT DOCUMENTS

| | | |
|---|---|---|
| EP | 2378455 A2 | 10/2011 |
| EP | 3823236 A1 | 5/2021 |

*Primary Examiner* — Harris C Wang
(74) *Attorney, Agent, or Firm* — Faegre Drinker Biddle & Reath LLP

(57) ABSTRACT

A system for managing custom code within a data computing platform determines that a request for one or more uniform resource identifiers external to the platform is being made by custom code executing in the platform. In response to the determination, the system checks a whitelist of allowable external URIs against the requested one or more URIs and allows access to the requested one or more URIs if a match is detected with the whitelist, otherwise access by the custom code to the requested one or more URIs is denied. In addition, or alternatively, the system checks a blacklist of disallowed external URIs against the requested one or more URIs and denies access to the requested one or more URIs if a match is detected with the blacklist, otherwise access by the custom code to the requested one or more URIs is allowed. The blacklist can override the whitelist.

20 Claims, 5 Drawing Sheets

(56) References Cited

U.S. PATENT DOCUMENTS

| | | |
|---|---|---|
| 2014/0317454 A1 | 10/2014 | Gataullin |
| 2016/0142432 A1 | 5/2016 | Manadhata |
| 2016/0266998 A1* | 9/2016 | Gautallin ............ G06F 11/3093 |
| 2017/0126686 A1 | 5/2017 | Totov |
| 2017/0168918 A1* | 6/2017 | Wieczorek ............. H04L 67/10 |
| 2018/0020002 A1 | 1/2018 | Duca et al. |
| 2019/0005454 A1* | 1/2019 | Hilckox ................ H04L 63/108 |
| 2019/0050560 A1* | 2/2019 | Pereira ................ G06F 9/45558 |
| 2019/0132289 A1* | 5/2019 | Hulick, Jr. .......... H04L 63/0245 |
| 2019/0312846 A1* | 10/2019 | Taylor ................ H04L 63/1408 |
| 2020/0092332 A1* | 3/2020 | Bhattathiri ............. H04L 63/20 |
| 2020/0329055 A1* | 10/2020 | Tyagi ................. H04L 63/1416 |
| 2021/0037018 A1* | 2/2021 | Joyce ................. H04L 63/0209 |
| 2021/0112032 A1* | 4/2021 | DiRosa ............... H04L 63/0245 |
| 2021/0144145 A1* | 5/2021 | Ding ....................... H04L 63/20 |

* cited by examiner

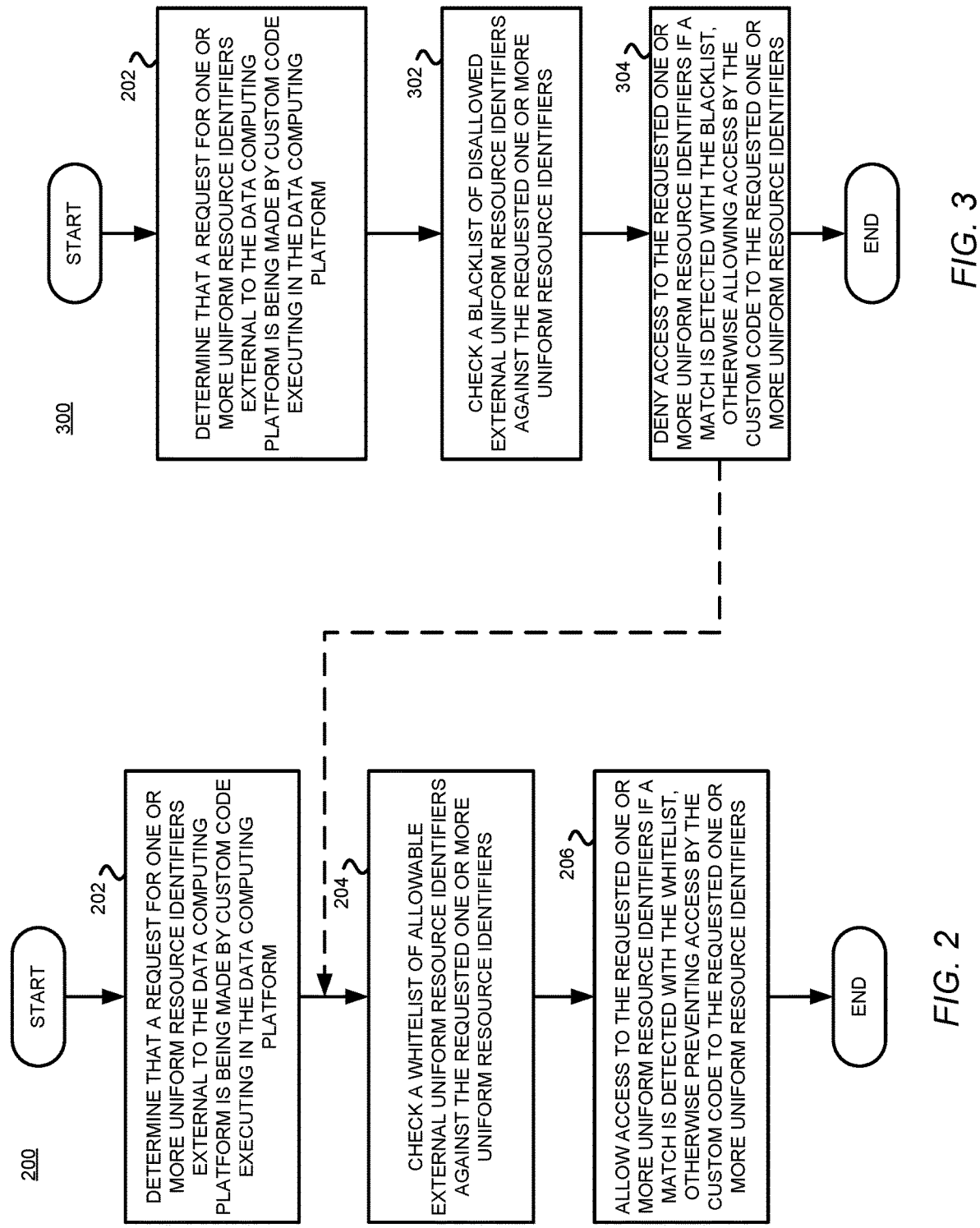

SYSTEMS AND METHODS FOR MANAGING CUSTOM CODE IN A DATA COMPUTING PLATFORM

1. CROSS REFERENCE TO RELATED APPLICATIONS

This application is a continuation of U.S. patent application Ser. No. 16/700,153, filed Dec. 2, 2019, which claims priority to U.S. Provisional Application No. 62/934,737, filed Nov. 13, 2019, both of which are incorporated by reference herein for all purposes.

2. BACKGROUND

Certain embodiments of the present invention are directed to managing code execution in data computing platforms. More particularly, some embodiments of the present invention provide systems and methods for managing custom code in a data computing platform.

External developers are authoring and deploying custom code such as application programming interfaces (APIs) and/or other types of code that perform transformations on data of data sets generated by data computing platforms, such as a cloud-based data analytics platform. Some of the custom API's have use cases that require making external network requests to resources outside of the data computing platform. The custom APIs, for example, may attempt to pull state information from an external system, attempt to pull external data or export internal platform data.

For example, currently custom API repository editors that are granted permission to repositories inside the data computing platform can publish code, regardless of a project to which the repository belongs. A single repository can publish multiple custom API code references that can be deployed at a later point in time. Project editors can take a published code reference and deploy the code reference to their project, so the API instance belongs to a project. However, custom APIs with malicious code that accesses external systems can potentially cause security issues by exporting data sets that are generated in the data computing platform, or other data or information used by the data computing platform.

Hence it is highly desirable to improve techniques for managing custom code that is provided by customers of the data process platform, or from other external sources, that is executed by the data computing platform.

3. SUMMARY

In certain implementations, a system and method for managing custom code within a data computing platform determines that a request for one or more uniform resource identifiers (e.g., URIs and path information) external to the platform is being made by custom code executing in the data computing platform. In response to the determination, the system and method check a whitelist of allowable external uniform resource identifiers against the requested one or more uniform resource identifiers and allow access to the requested one or more URIs if a match is detected with the whitelist, otherwise access by the custom code to the requested one or more URIs is denied.

The determining that the request for the one or more uniform resource identifiers external to the data computing platform is being made by custom code may comprise employing a proxy server to intercept the request for the one or more uniform resource identifiers external to the data computing platform. The method may further comprise linking a manifest file to a project identifier related to the custom code, the manifest file including the whitelist that lists the allowable uniform resource identifiers that are external to the data computing platform, the allowable uniform resource identifiers being approved to be accessed by the custom code during execution of the custom code. The method may comprise checking a blacklist of uniform resource identifiers external to the data computing network on a per registered organization level and denying access to a whitelisted uniform resource identifier if the whitelisted uniform resource identifier is on the blacklist. The whitelist may comprise data representing that a data set can be accessed by the requested one or more external uniform resource identifiers. The method may comprise providing through the data computing platform, a user interface configured to allow generation of a default whitelist on a per custom code basis and configured to allow changes to the default whitelist.

In some implementations, a system and method for managing custom code within a data computing platform determines that a request for one or more uniform resource identifiers external to the platform is being made by custom code executing in the data computing platform. In response to the determination, the method and system check a blacklist of disallowed external uniform resource identifiers against the requested one or more uniform resource identifiers and deny access to the requested one or more URIs if a match is detected with the blacklist, otherwise access by the custom code to the requested one or more URIs is allowed. In certain implementations the blacklist overrides the whitelist.

According to certain implementations, a non-transitory storage medium includes executable instructions that when executed by one or more processors, causes the one or more processors to determine that a request for one or more uniform resource identifiers external to the data computing platform is being made by custom code executing in the data computing platform. In some implementations, the storage medium includes executable instructions that when executed by one or more processors, causes the one or more processors to check a whitelist of allowable external uniform resource identifiers against the requested one or more uniform resource identifiers, in response to the determination and allow access to the requested one or more uniform resource identifiers if a match is detected with the whitelist, otherwise preventing access by the custom code to the requested one or more uniform resource identifiers.

In some implementations, a manifest file includes a whitelist that is created as part of a custom API repository. The manifest file is populated by code authors or administrators to require the code authors to declare external network resources that the code authors depend on for each individual API. In certain implementations, the manifest file is linked to each project, such that each project is given a separate whitelist. In some implementations, the whitelist is a list of universal resource identifier prefixes (URI) (e.g., :/or://) or URL and path designations. However, any suitable format for the list may be employed. In some implementations, a custom API policy manager uses the manifest file and will only allow access to the URLs or URIs or other external resource identifiers that are in a whitelist on a project designation level, organization level or API level if desired. In some implementations, an organization, through a user interface, creates a default whitelist of URI prefixes for any project within the organization. Where multiple whitelists exist for an organization, the whitelist with the more restrictive listing will be used as the default. Data owners of the project can override their project default whitelist by removing allowed URI prefixes or by allowing additional URI prefixes.

Depending upon the embodiment, one or more benefits may be achieved. These benefits and various additional benefits can be fully appreciated with reference to the detailed description and accompanying drawings that follow.

4. BRIEF DESCRIPTION OF THE DRAWINGS

The implementations will be more readily understood in view of the following description when accompanied by the below figures, wherein like reference numerals represent like elements, and wherein:

FIG. 2 is a flowchart illustrating a method for managing custom code in a data computing platform in accordance with one example set forth in the disclosure;

FIG. 3 is a flowchart illustrating a method for managing custom code in a data computing platform in accordance with one example set forth in the disclosure;

5. DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some embodiments, benefits include significant improvements, including for example, increased security for data computing platforms by preventing the leaking of customer data from the data computing platform through custom APIs or other forms of third party authored code, to external network resources.

In certain embodiments, one or more solutions rooted in computer technology overcome one or more problems specifically arising in the realm of computer technology. Some embodiments are directed to restricting access to external internet sites or external resources by custom code being executed on data computing platforms. In some embodiments, the data computing platform includes workspace servers that provide access to applications to client devices through a browser-based user interface. Some embodiments are directed to data computing platforms including hosts and networking devices. In some examples, the computing platforms include virtual servers or virtual machines. In certain examples, the data computing platforms include a virtual computing environment that provides an operating system and/or an application server for running one or more containers. For example, a container includes a containerized application. In some examples, one or more containers run on a server or host machine of the computing platform and are associated with particular resources that include CPU, memory, storage, and/or networking capacity.

Figure 1:
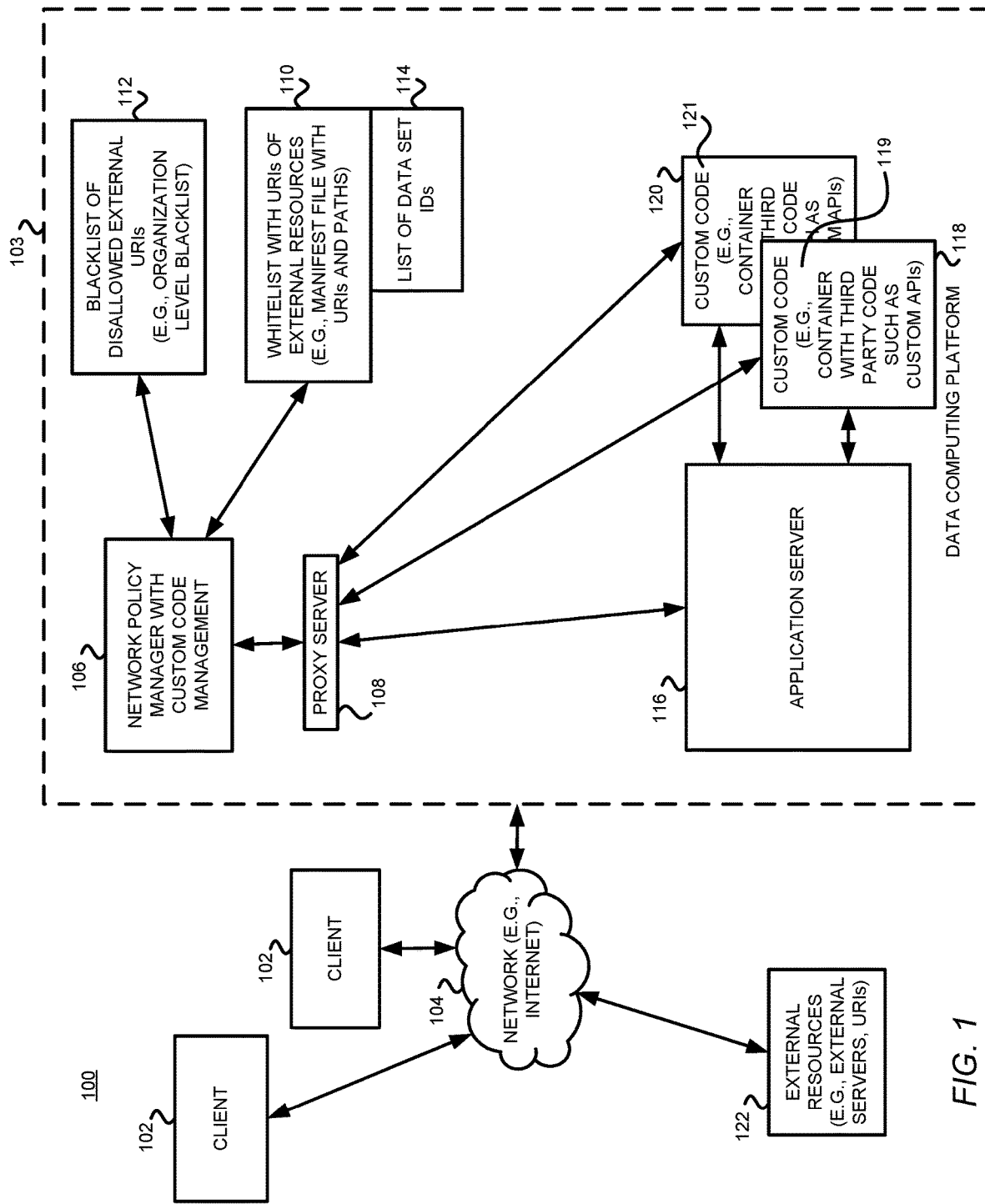
FIG. 1 is a block diagram illustrating a system that employs a data computing platform with a network policy manager that provides custom code management in accordance with one example set forth in the disclosure.

FIG. 1 illustrates a system 100 that includes one or more client devices 102 that communicate with a data computing platform 103 through network 104. In certain embodiments, the client devices 102 present a browser-based user interface, the contents of which are provided by the data computing platform 103. In certain implementations, the system 100 utilizes the data computing platform 103 for integrating, managing and interacting with data from different sources and formats. For example, the data computing platform may be a cloud-based data analytics platform. However, any suitable system may be employed. In some examples, the client devices are one or more of laptop computers, tablets, hardware servers, desktops or any suitable devices.

In this example, the data computing platform 103 includes a network policy manager 106 with custom code management capabilities as further described herein. In some examples, the network policy manager 106 interfaces with a proxy server 108. In other examples, the proxy server 108 is not employed. In certain implementations, the network policy manager 106 or other service in the data computing platform 103, stores a whitelist 110 of allowable external uniform resource identifiers on a per project basis. A project is considered a grouping unit based on data sensitivity criteria. For example, for data sets that have highly sensitive data, those data sets are put in a highly sensitive project. A project includes data such as data sets and APIs.

In some implementations, the network policy manager 106 stores one or more blacklists 112 of uniform resource identifiers that are external to the data computing network, on a per-registered organization level. The blacklist 112 includes data representing one or more disallowed external uniform resource identifiers. In some implementations, the one or more whitelists 110 and one or more blacklists 112 are stored in a database, or, in other implementations the blacklists and whitelists are integrated as part of a manifest file, however any suitable data structure may be employed. In some implementations, the network policy manager 106 stores the whitelist 110 with URIs and associated path information. In some implementations, a whitelist includes both a subject name and path designator. In some implementations, the whitelist 110 includes one or more data set identifiers 114 that identify data sets that can be exported to external uniform resource identifiers. The network policy manager 106 in one example is implemented as one or more processors executing instructions that are stored in memory that when executed cause the one or more processors to operate as described herein.

In some implementations, an organizational level blacklist provides an organization level blacklist to override all other whitelists associated with the organization such that the blacklist is applied to all custom code used by the computing platform for a given organization. In one example, the proxy server 108 handles all of the requests from the custom code, and the proxy server 108 interfaces with the network policy manager 106 to check the whitelist and the organization level blacklist and if the external resource being requested is on the whitelist but not on the organization level blacklist, then the network policy manager 106 allows access. Otherwise, access is denied. For example, the network policy manager 106 receive inquiries from the proxy server 108 and the network policy manager 106 sends a "yes" or "no" authorization reply. A "yes" is sent for the custom API to use the URI on the whitelist so long as the requested URI is not on the organization level blacklist. In another example, no proxy server is employed and instead layer seven interrupts are used to cause the network policy manager 106 to check the whitelist/blacklist.

In some implementations, an organization level approach is used, and a blacklist of external network resources is used such as domain names or other identifiers so that no projects within an organization are allowed access to the blacklisted external resources. In some implementations, the network policy manager 106 employs the project level whitelist 110, an organizational level blacklist 112, and a data set permission list 114 to control external resource access on a data set level. In some embodiments, the data computing platform 103 includes a cluster computing platform including one or more server or host machines. In some examples, the data computing platform 103 includes a distributed computing platform that allows the one or more device clients 106 to distribute applications and/or data over the network 104 to a cluster of servers or host machines. In certain examples, the computing platform 103 includes a cloud computing platform that allows the one or more device clients 102 access to remote servers, data storages, networks, devices, applications and/or data resources over the network 104. For example, multiple users through the one or more client devices 102 store data at the data storages of the cloud computing platform. In other examples, the data computing platform 103 is associated with a platform provider that provides the platform to multiple customers. For example, customers of the computing platform 103 include individuals, organizations and/or commercial companies.

In certain embodiments, the one or more servers or host machines in the data computing platform are divided into in one or more regions. For example, a region represents a geographic area that the one or more servers or host machines are located within. As an example, each region relates to a different geographic area. In other examples, each region of the one or more servers or host machines includes one or more separate zones. For example, each server or host machine within a region is associated with only one zone of the one or more separate zones associated with the region. As an example, each zone within a region are isolated from any other zone within the region. In one example, each zone within a region is connected with any other zone within the region through low-latency links. In some examples, the computing platform 103 is configured to not replicate applications and/or resources across different regions. For example, each region is completely independent from any other region of the computing platform 103.

According to some embodiments, the data computing platform 103 includes a container-orchestration platform. In some examples, the container-orchestration platform allows for automated deployment, scaling and/or operations of containers across the platform. For example, the container-orchestration platform employs the containers across one or more instances of the computing platform 103.

According to certain embodiments, a container of the data computing platform 103 includes one or more applications. In some examples, the container also includes data and libraries associated with the one or more applications. For example, the container allows the one and more applications and their associated data and libraries to be co-located on the same server or host machine. In one example, the container allows the one and more applications and their associated data and libraries to share resources. For example, the shared resources include CPU, memory, storage, and/or networking capacity. As an example, the container represents the lowest level of a micro-service of the data computing platform 103. In one example, the micro-service includes the one or more applications, libraries and the applications' dependencies.

In the example of FIG. 1, the data computing platform 103 includes a workspace server that brokers communications between one or more client devices 102, such as queries sent through a browser interface. The workspace server provides a runtime environment for the browser-based user interface and application operation. The workspace server may include or communicate with an application server 116. In some implementations, a workspace server receives, from the one or more client devices 102, through a browser user interface, a request to access an application, such as from multiple applications that are provided by the application server 116. The workspace server provides the applications and navigational graphic user interface elements for rendering at the client device 102. In this example, the applications are configured as containers, such as Kubernetes containers or any other suitable structure. In this example, application containers 118 and 120 include custom code 119 and 121 respectively, such as custom APIs or other suitable code written by a third party, for example, such as a customer of the data computing platform that utilizes the client devices 102. In some implementations, a Kubernetes container system is used to run the custom code attempting to make calls to an external network resource. All calls for external resources are forced to a proxy network server that calls a policy manager that allows or denies access to external resources based on the whitelist and/or blacklist. In some implementations, the policy manager is a micro service within the data computing platform. The components of the data computing platform are in communication with each other as illustrated by arrows through suitable communication interfaces, links, calls, or any other suitable communication mechanism.

The system 100 includes external resources 122, such as external resources accessible through web servers through URIs or through other suitable servers. The external resources 122 can be accessed by the data computing platform through network 104. Clients 102 may also access external resources 122. In one example, the external resources can be certain websites, or any other suitable resource destination that employs, for example, a uniform resource identifier, such as URI and path designation, URLs or any other suitable identifiers. In some implementations, the external resources 122 are resources outside of both a low trust and high trust VPC. In one example, the network policy manager 106 with custom code management prevents access to the external resources 122 by custom code 119 and/or 121 that is executing inside the data computing platform 103. The network policy manager 106 enforces a blacklist and/or whitelist policy, in one example, based on projects carried out by the data computing platform, to allow and disallow specific external resources that custom APIs can interact with. In some examples, networking primitives are used to enforce the policies at a network level.

In some implementations, the network policy manager 106 allows a customer, through a browser-based user interface (see e.g., FIG. 5), to create or populate a manifest file that in one example, is part of a custom API repository. The customers (e.g., the custom code authors) declare through the user interface, the external network resources 122 that the custom API depends on, for each individual API. In one example, the manifest file is expressed as a list of URI prefixes (e.g., :\or :\\).

In some implementations, by default, no external resource access is allowed. In other implementations as set forth further below, an organization administrator is provided with a graphic user interface to define a default whitelist of URI prefixes so that a project for that organization will inherent the same whitelist. In certain implementations, the network policy manager 106 causes a project that employs operations from multiple organizations to inherent the most restrictive whitelist among the multiple organization whitelists. In some implementations, the network policy manager 106 provides a graphic user interface to allow data owners of the project to override default whitelists by provide removal of allowed URI prefixes from a whitelist or allow additional URI prefixes to be added to the whitelist.

In some implementations, the network policy manager 106 authorizes deployment of a code reference such as a custom API, as part of a project if the code reference's associated manifest file contents are consistent with the project's external URI prefix whitelist. If the code reference being deployed has a manifest file which requires additional network resources not included in the project's URI prefix whitelist, the deployment will be denied by the network policy manager 106 or the project owner can request an exception for their API that requires the project owner approval. The project editor can request the exception from the project owner via an out of band communication or through a user interface provided by the network policy manager. In some implementations, the network policy manager 106 provides a graphic user interface or other interface that allows the data owner to view a project's external network policy by providing the whitelist and/or blacklist information on a per-project basis if desired. In some implementations, code owners are responsible for declaring the external network resources that their code requires by filling out the whitelist 110 and/or blacklist 112 which is then used as a baseline for determining whether a requested external resource is on the whitelist 110 or blacklist 112. In some implementations, project owners (e.g., data owners) can make exceptions for specific custom APIs to interact with ordinarily disallowed resources. Project owners can also be empowered to allow external network resources for their project and data. An organization can globally allow external resources for their projects or globally deny external resources for their projects on an organizational level through the blacklist.

In some implementations, the blacklist 112 is an organizational level blacklist which disallows access to specific external network resources that are listed in the blacklist. In some implementations, the disallowance is provided either through a project level exception or API level exception. In some implementations, projects can involve multiple organizations and as such, a single project may be eligible for several organizational blacklists. As such, the project, in one example, has the most restrictive combination of all blacklists applied to the project by the network policy manager 106. In one example, the super set of blacklisted resources from multiple organizations are applied to the project. In one implementation, in order for a project owner to override an organizational blacklist either for the project or for a specific custom API belonging to the project, the project owner needs to request approval from each organization which has blacklisted the URI prefix in question. This request may be done external to the data platform or through user interface provided by the network policy manager for requesting administrators of each of the organizations to grant approval of the requested API that is to be removed from the blacklist.

FIG. 2 is a flowchart illustrating an example of a method 200 for managing custom code within a data computing platform according to one embodiment of the present disclosure. This diagram is merely an example, which should not unduly limit the scope of the claims. One of ordinary skill in the art would recognize many variations, alternatives, and modifications. The method 200 although being shown using a selected group of processes, there can be many alternatives, modifications and variations. For example, some of the processes may be expanded and/or combined. Other processes may be inserted to those noted above. Depending upon the embodiment, the sequence of processes may be interchanged with others replaced, or the sequence altered.

In some embodiments, some or all processes (e.g., steps) of the method 200 are performed by the network policy manager 106. In certain examples, some or all processes (e.g., steps) of the method 200 are performed by a computer and/or a processor directed by a code. For example, a computer includes a server computer and/or a client computer (e.g., a personal computer). In some examples, some or all processes (e.g., steps) of the method 200 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some examples, the method includes, as shown in block 202, determining that a request for one or more uniform resource identifiers external to the data computing platform 103 is being made by custom code executing in the data computing platform 103. In one example, determining that the request for the one or more uniform resource identifiers external to the data computing platform includes employing the proxy server 108 to intercept the request for the one or more uniform resource identifiers. The request, for example, may come from the containers that include the custom code 119 and/or 121 being executed and calling for a particular external resource such as a particular uniform resource identifier and path. In some implementations, each container is required to use the proxy handle corresponding to the proxy server 108 so that all external resource requests are passed through the proxy server 108. In other examples, a different network interface is employed such as a layer 7 interrupt so that a container communicates directly with the network policy manager 106. In the example where the proxy server 108 is employed, the network policy manager 106 receives an inquiry from the proxy server 108 that provides the requested uniform resource identifier that is external to the data computing platform.

As shown in block 204, the network policy manager 106 checks the whitelist 110 for allowable external uniform resource identifiers against the requested uniform resource identifier in the inquiry. As shown in block 206, if a match is found, meaning that the requested uniform resource identifier that is external to the data computing platform matches a URI that is on the whitelist 110, the network policy manager 106 allows access to the external uniform resource identifier. Otherwise the network policy manager sends a denial to the proxy server preventing access by the custom code to the requested external uniform resource identifier.

In some implementations, the whitelist 110 also includes data 114 representing that a data set can be accessed by the requested external uniform resource identifier. As such, an additional level of security is provided such that even if a URI is on the whitelist, a particular data set can also be added to the whitelist to allow data sets to be exported to the external resources. If the data set is not on the whitelist, then access to that data set is denied. The data set that is requested can also in some implementations come from the custom code being executed and is included in the request to the proxy server. As such, although access may be granted to a particular external resource, particular data sets can be denied exportation from the data computing platform to an allowable URI.

FIG. 3 is a flowchart showing a method 300 for managing custom code within a data computing platform according to one embodiment of the present disclosure. This diagram is merely an example, which should not unduly limit the scope of the claims. One of ordinary skill in the art would recognize many variations, alternatives, and modifications. Although the method is shown as using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. In other implementations, the combinations of the methods shown in FIG. 2 and FIG. 3 are employed by the system such that a combination of a whitelist and blacklist technique employed by the network policy manager 106.

In some embodiments, some or all processes (e.g., steps) of the method 300 are performed by the network policy manager 106. In certain examples, some or all processes (e.g., steps) of the method 300 are performed by a computer and/or a processor directed by a code. For example, a computer includes a server computer and/or a client computer (e.g., a personal computer). In some examples, some or all processes (e.g., steps) of the method 300 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

As shown in block 202, the method includes determining that a request for one or more uniform resource identifiers external to the data computing platform is being made by a custom code executing in the data computing platform. As shown in block 302, the method includes, in response to the determination, checking the blacklist 112 of disallowed external uniform resource identifiers against the requested one or more resource identifiers. For example, the network policy manager 106 compares a requested URI to the URIs in the blacklist 112. The URIs in the blacklist 112 are URIs that are disallowed by the network policy manager as defined by a customer organization. Accordingly, if the requested URI matches a URI in the blacklist, the network policy manager 106 denies access to the requested URI. As shown in block 304, the method includes denying access to the requested URI if a match is detected with a URI in the blacklist 112. However, if the URI is not on the blacklist, in one implementation, the network policy manager 106 allows access by the custom code to the requested URI. In another implementation, a second level of security is provided such that if the requested URI is not on the blacklist, the method includes performing the operation shown in block 204 to check the whitelist 110 for the project to determine if the requested URI is in the whitelist 110.

In another example, the network policy manager 106 checks the blacklist 112 even if the URI is listed on the whitelist 110 and denies access to a whitelisted uniform resource identifier if the whitelisted uniform resource identifier is on the blacklist 112. This allows an organizational level blacklisting of URIs even though a project may identify external URIs as being on a whitelist. As such, organizational level override can occur.

Figure 4:
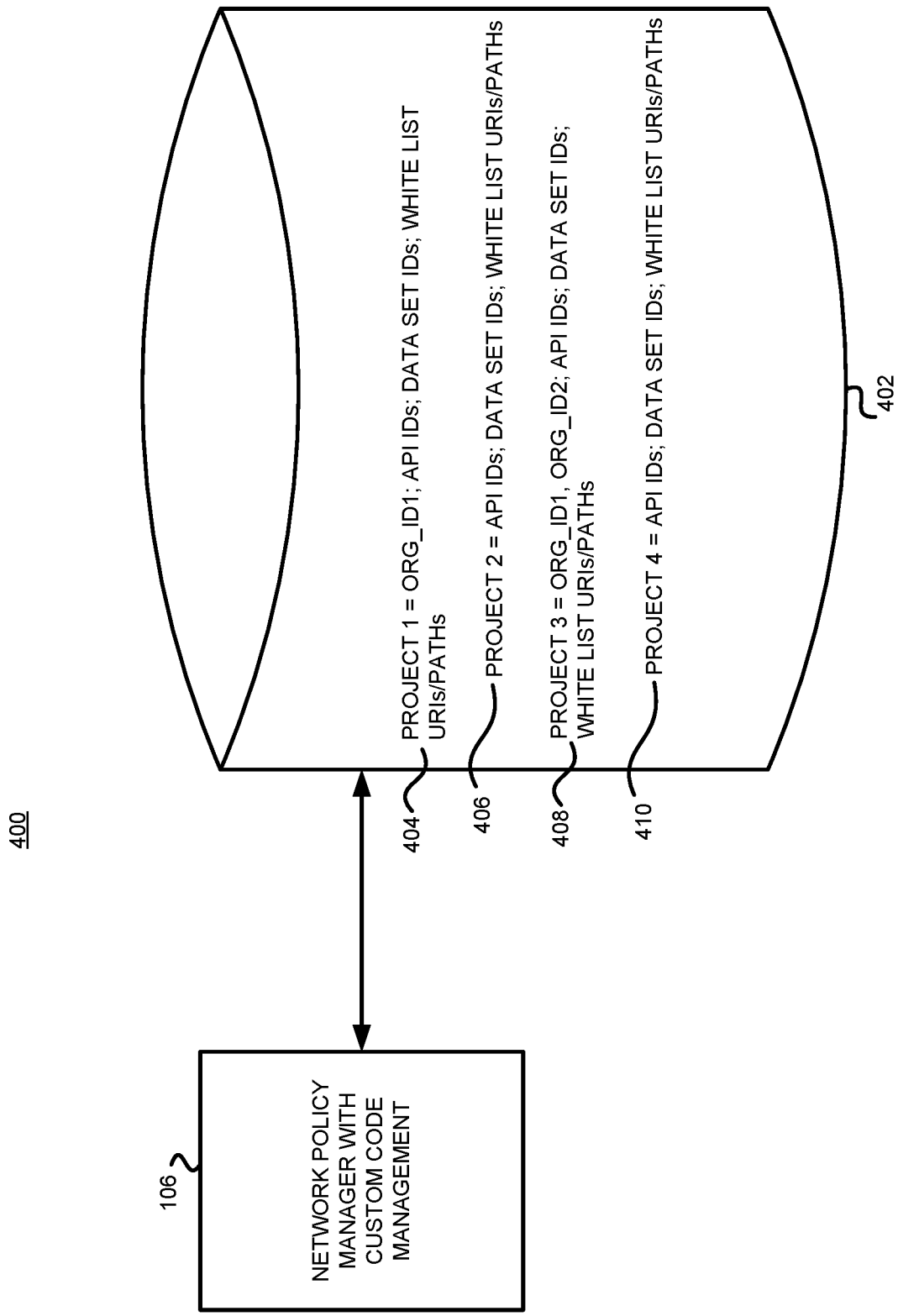
FIG. 4 is a block diagram illustrating a portion of a data computing platform that employs a network policy manager with custom code management in accordance with one example set forth in the disclosure.

FIG. 4 illustrates one example of a system 400 for managing custom code within a data computing platform that in this example, employs project level management using data stored in database 402. It will be recognized however that any suitable level of policy management may be employed to deny access to external resources. Each project 404-410 has one or more organization identifiers. For example, project 408 is shown as employing ORG_ID1 and ORG_ID2. Each project also includes identifiers for corresponding custom APIs and data sets, so that the network policy manager 106 based on a requested custom API (and data set identifier), can search for the appropriate whitelist and/or blacklist. Where multiple organizations are involved in a project such as project 408, the network policy manager 106 combines the URI listings from the blacklists for organizations ORG_ID1 and ORG_ID2 and uses the combined listings as the search list for the API for the project.

Figure 5:
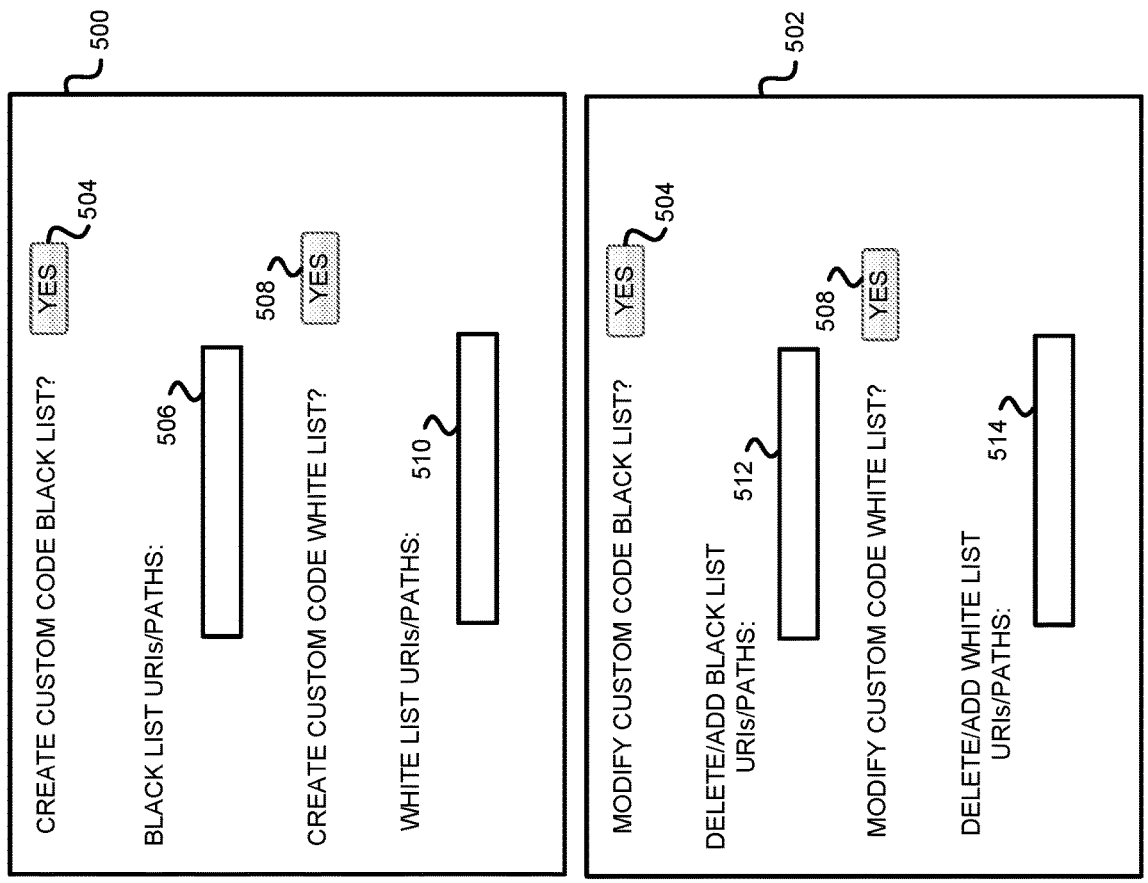
FIG. 5 illustrates graphic user interfaces for creating and modifying custom code blacklists and custom code whitelists in accordance with one example set forth in the disclosure.

FIG. 5 illustrates examples of graphic user interfaces such as browser-based user interfaces that are provided, in one example, by the network policy manager 106 to create the blacklists 112 and whitelists 110 and/or modify the blacklists and whitelists. However, a different component within the data computing platform 103 may also provide the user interfaces such as an administrator process or any other suitable operation. In this example, the data computing platform 103 provides a user interface 500 configured to allow generation of a per organization blacklist and a whitelist (including a default whitelist) on a per-custom code basis and per organization basis and another interface 502 is provided to allow changes to the whitelist and/or blacklist. For example, an organization administrator is allowed to create a custom code blacklist 112 through a selection feature 504 such as a GUI button or other feature. If the user selects "yes", one or more external URI entry fields 506 is presented to allow the entry of the one or more URIs and associated paths for inclusion in the blacklist 112. Similarly, activation feature 508 is provided to allow the creation of whitelist 110 and entry field 510 is provided to allow the entry of URIs and associated paths to be entered and stored as the whitelist 110. In some implementations, a default whitelist is used on an organizational basis so that when a new project within the organization is created, the default whitelist is assigned to the new project.

User interface 502 allows the modification of a custom code blacklist 112 and/or custom code whitelist 110 and allows the deletion or addition of blacklist URIs through one or more fields 512 which may provide a pulldown listing of existing URIs in a blacklist. A selection feature may also be added to allow switching between deletion or addition of URIs. Similarly, one or more deletion and/or addition fields 514 is provided to allow the deletion or addition of whitelist URIs. In some implementations, a user interface is provided to allow data owners to conveniently view their project external network policy, how their organization markings affect the policy, overrides set by other project owners, and exceptions made to custom APIs deployed by their project. In some implementations, the interfaces 500 and 502 are displayed by the client devices as administrator interfaces that allows the changing of whitelist on a per-project basis and/or at an organizational level.

As set forth above, in some implementations, a manifest file includes a whitelist that is created as part of a custom API repository. The manifest file is populated by code authors or administrators to require the code authors to declare external network resources that the code authors depend on for each individual API. In certain implementations, the manifest file is linked to each project, such that each project is given a separate whitelist. In some implementations, the whitelist is a list of universal resource identifier prefixes (URI) (e.g., :/or ://) or URL and path designations. However, any suitable format for the list may be employed. In some implementations, a custom API policy manager uses the manifest file and will only allow access to the URLs or URIs or other external resource identifiers that are in a whitelist on a project designation level, organization level or API level if desired. In some implementations, an organization, through a user interface, creates a default whitelist of URI prefixes for any project within the organization. Where multiple whitelists exist for an organization, the whitelist with the more restrictive listing will be used as the default. Data owners of the project can override their project default whitelist by removing allowed URI prefixes or by allowing additional URI prefixes.

Figure 6:
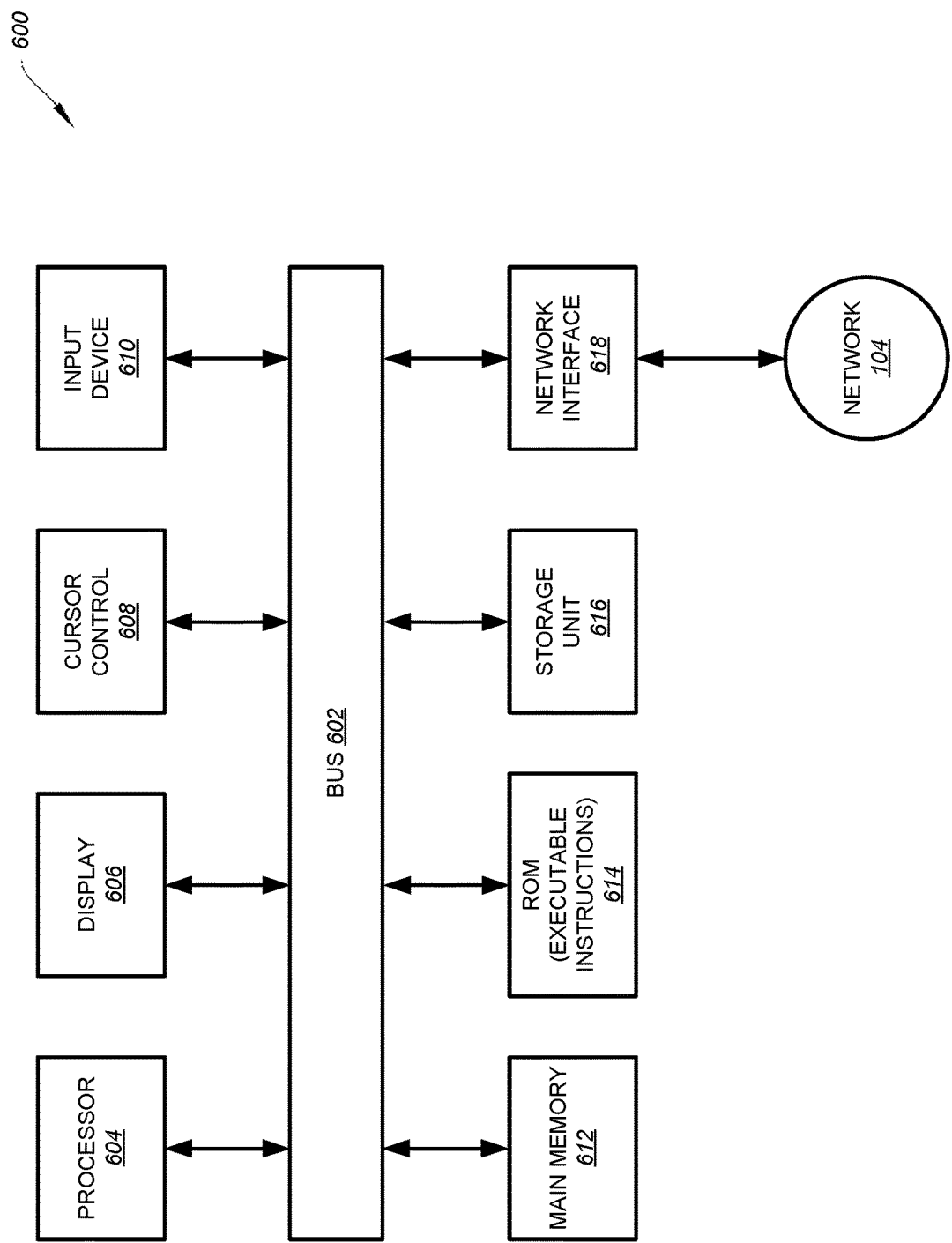
FIG. 6 is a simplified diagram showing a computing system for implementing a system for managing custom code in a data computing platform in accordance with one example set forth in the disclosure.

FIG. 6 is a simplified diagram showing a computing system for implementing the system for managing custom code in a computing platform according to one embodiment of the present disclosure. This diagram is merely an example, which should not unduly limit the scope of the claims. One of ordinary skill in the art would recognize many variations, alternatives, and modifications. The computing system 600 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the method 200 and/or the method 300 are performed by the computing system 600. In some examples, the bus 602 is coupled to the processor 604, the display 606, the cursor control component 607, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For examples, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control 608 (e.g., a mouse, a trackball, or cursor direction keys) is configured to communicate additional information and commands (e.g., to control cursor movements on the display 606) to the processor 604.

According to some embodiments, a method for managing custom code within a data computing platform includes determining that a request for one or more uniform resource identifiers external to the data computing platform is being made by custom code executing in the data computing platform, in response to the determination, checking a whitelist of allowable external uniform resource identifiers against the requested one or more uniform resource identifiers and allowing access to the requested one or more uniform resource identifiers if a match is detected with the whitelist, otherwise preventing access by the custom code to the requested one or more uniform resource identifiers and wherein the method is performed using one or more processors. For example, the method is implemented according to at least FIG. 1, FIG. 2, FIG. 3, FIG. 4, FIG. 5 and/or FIG. 6.

In certain examples, determining that the request for the one or more uniform resource identifiers external to the data computing platform is being made by custom code includes employing a proxy server to intercept the request for the one or more uniform resource identifiers external to the data computing platform.

In some examples, the method includes linking a manifest file to a project identifier related to the custom code, the manifest file including the whitelist that lists the allowable uniform resource identifiers that are external to the data computing platform, the allowable uniform resource identifiers being approved to be accessed by the custom code during execution of the custom code.

In certain examples, the method includes checking a blacklist of uniform resource identifiers external to the data computing network on a per registered organization level and denying access to a whitelisted uniform resource identifier if the whitelisted uniform resource identifier is on the blacklist.

In some examples, the whitelist includes data representing that a data set can be accessed by the requested one or more external uniform resource identifiers.

In certain examples, the method includes providing through the data computing platform, a user interface configured to allow generation of a default whitelist on a per custom code basis and configured to allow changes to the default whitelist.

According to certain embodiments, a method for managing custom code within a data computing platform includes determining that a request for one or more uniform resource identifiers external to the data computing platform is being made by custom code executing in the data computing platform, in response to the determination, checking a blacklist of disallowed external uniform resource identifiers against the requested one or more uniform resource identifiers and denying access to the requested one or more uniform resource identifiers if a match is detected with the blacklist, otherwise allowing access by the custom code to the requested one or more uniform resource identifiers and wherein the method is performed using one or more processors. For example, the method is implemented according to at least FIG. 1, FIG. 2, FIG. 3, FIG. 4, FIG. 5 and/or FIG. 6.

In some examples, checking of the blacklist includes checking of uniform resource identifiers external to the data computing network on a per registered organization level.

According to some embodiments, a system for managing custom code within a data computing platform, the system includes one or more processors and non-transitory storage medium that stores executable instructions that when executed causes the one or more processors to determine that a request for one or more uniform resource identifiers external to the data computing platform is being made by custom code executing in the data computing platform, in response to the determination, check a whitelist of allowable external uniform resource identifiers against the requested one or more uniform resource identifiers and allow access to the requested one or more uniform resource identifiers if a match is detected with the whitelist, otherwise preventing access by the custom code to the requested one or more uniform resource identifiers. For example, the system is implemented according to at least FIG. 1, FIG. 2, FIG. 3, FIG. 4, FIG. 5 and/or FIG. 6.

In certain examples, the system employs a proxy server to intercept the request for the one or more uniform resource identifiers external to the data computing platform. In some examples, the system links a manifest file to a project identifier related to the custom code, the manifest file including the whitelist that lists the allowable uniform resource identifiers that are external to the data computing platform, the allowable uniform resource identifiers being approved to be accessed by the custom code during execution of the custom code.

In certain examples, the system checks a blacklist of uniform resource identifiers external to the data computing network on a per registered organization level and deny access to a whitelisted uniform resource identifier if the whitelisted uniform resource identifier is on the blacklist. In some examples, the system stores the whitelist that includes data representing that a data set can be accessed by the requested one or more external uniform resource identifiers.

In certain examples, the system provides a user interface configured to allow generation of a default whitelist on a per custom code basis and configured to allow changes to the default whitelist.

According to certain embodiments, a non-transitory storage medium includes executable instructions that when executed by one or more processors, causes the one or more processors to determine that a request for one or more uniform resource identifiers external to the data computing platform is being made by custom code executing in the data computing platform, in response to the determination, check a whitelist of allowable external uniform resource identifiers against the requested one or more uniform resource identifiers and allow access to the requested one or more uniform resource identifiers if a match is detected with the whitelist, otherwise preventing access by the custom code to the requested one or more uniform resource identifiers. For example, the method is implemented according to at least FIG. 1, FIG. 2, FIG. 3, FIG. 4, FIG. 5 and/or FIG. 6.

In some examples, the non-transitory storage medium includes executable instructions that when executed by one or more processors, causes the one or more processors to: wherein the non-transitory storage medium that stores executable instructions that when executed causes the one or more processors to employ a proxy server to intercept the request for the one or more uniform resource identifiers external to the data computing platform.

In certain examples, the non-transitory storage medium includes executable instructions that when executed causes the one or more processors to link a manifest file to a project identifier related to the custom code, the manifest file including the whitelist that lists the allowable uniform resource identifiers that are external to the data computing platform, the allowable uniform resource identifiers being approved to be accessed by the custom code during execution of the custom code.

In some examples, the non-transitory storage medium includes executable instructions that when executed causes the one or more processors to check a blacklist of uniform resource identifiers external to the data computing network on a per registered organization level and deny access to a whitelisted uniform resource identifier if the whitelisted uniform resource identifier is on the blacklist.

In certain examples, the non-transitory storage medium includes executable instructions that when executed causes the one or more processors to store the whitelist that includes data representing that a data set can be accessed by the requested one or more external uniform resource identifiers.

In some examples, the non-transitory storage medium includes executable instructions that when executed causes the one or more processors to provide a user interface configured to allow generation of a default whitelist on a per custom code basis and configured to allow changes to the default whitelist.

Additionally, the methods and systems described herein may be implemented on many different types of processing devices by program code including program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for managing custom code within a data computing platform comprising:
    linking a manifest file to a project identifier related to the custom code, the manifest file including a whitelist of allowable external uniform resource identifiers;
    checking the whitelist of allowable external uniform resource identifiers against one or more uniform resource identifiers;
    allowing access by the custom code to the one or more uniform resource identifiers if a match is detected with the whitelist of allowable external uniform resource identifiers, otherwise denying access by the custom code to the one or more uniform resource identifiers;
    checking a blacklist of uniform resource identifiers external to the data computing platform; and
    denying access by the custom code to a whitelisted uniform resource identifier if the whitelisted uniform resource identifier is on the blacklist of uniform resource identifiers;
    wherein the method is performed using one or more processors.

2. The method of claim 1, further comprising: determining that a request for the one or more uniform resource identifiers external to the data computing platform is being made by the custom code executing in the data computing platform.

3. The method of claim 2 wherein the determining that the request for the one or more uniform resource identifiers external to the data computing platform is being made by the custom code comprises employing a proxy server to intercept the request for the one or more uniform resource identifiers external to the data computing platform.

4. The method of claim 1 wherein the allowable uniform resource identifiers are approved to be accessed by the custom code during execution of the custom code.

5. The method of claim 1 wherein the whitelist comprises data representing that a data set can be accessed by the one or more external uniform resource identifiers.

6. The method of claim 1, further comprising: providing a user interface configured to allow generation of a default whitelist on a per custom code basis and configured to allow changes to the default whitelist.

7. The method of claim 1, wherein the checking a blacklist of uniform resource identifiers external to the data computing platform is performed on a per registered organization level.

8. The method of claim 1, wherein the custom code comprises a custom application programming interface (API).

9. The method of claim 8, wherein the custom code is within one or more containers running on the data computing platform.

10. A system for managing custom code within a data computing platform, the system comprising:
    one or more processors; and
    memory storing instructions that, when executed by the one or more processors, causes the system to perform a set of operations, the set of operations comprising:
        linking a manifest file to a project identifier related to the custom code, the manifest file including a whitelist of allowable external uniform resource identifiers;
        checking the whitelist of allowable external uniform resource identifiers against one or more uniform resource identifiers;
        allowing access by the custom code to the one or more uniform resource identifiers if a match is detected with the whitelist of uniform resource identifiers, otherwise deny access by the custom code to the one or more uniform resource identifiers;
        checking a blacklist of uniform resource identifiers external to the data computing platform; and denying access to a whitelisted uniform resource identifier if the whitelisted uniform resource identifier is on the blacklist of uniform resource identifiers.

11. The system of claim 10, wherein the set of operations further comprise:
determining that a request for one or more uniform resource identifiers external to the data computing platform is being made by the custom code executing in the data computing platform.

12. The system of claim 11, wherein the set of operations further comprises employing a proxy server to intercept the request for the one or more uniform resource identifiers external to the data computing platform.

13. The system of claim 10, wherein the allowable uniform resource identifiers are approved to be accessed by the custom code during execution of the custom code.

14. The system of claim 10, wherein the set of operations further comprises: storing the whitelist that comprises data representing that a data set can be accessed by the one or more external uniform resource identifiers.

15. The system of claim 10, wherein the set of operations further comprises: providing a user interface configured to allow generation of a default whitelist on a per custom code basis and configured to allow changes to the default whitelist.

16. The system of claim 10, wherein the checking a blacklist of uniform resource identifiers external to the data computing platform is performed on a per registered organization level.

17. A method for managing custom code within a data computing platform comprising:
executing the custom code within one or more containers running on the data computing platform;
linking a manifest file to a project identifier related to the custom code, the manifest file including a whitelist of allowable external uniform resource identifiers;
checking the whitelist of allowable external uniform resource identifiers against one or more uniform resource identifiers;
allowing access by the custom code to the one or more uniform resource identifiers if a match is detected with the whitelist of uniform resource identifiers, otherwise denying access by the custom code to the one or more uniform resource identifiers;
checking a blacklist of uniform resource identifiers external to the data computing platform; and
denying access by the custom code to a whitelisted uniform resource identifier if the whitelisted uniform resource identifier is on the blacklist of uniform resource identifiers;
wherein the method is performed using one or more processors.

18. The method of claim 17, wherein the custom code comprises a custom application programming interface (API).

19. The method of claim 17, wherein the checking a blacklist of uniform resource identifiers external to the data computing platform is performed on a per registered organization level.

20. The method of claim 17, further comprising: providing a user interface configured to allow generation of a default whitelist on a per custom code basis and configured to allow changes to the default whitelist.

* * * * *